(12) United States Patent
Mihara et al.

(10) Patent No.: US 11,884,318 B2
(45) Date of Patent: Jan. 30, 2024

(54) STEERING DEVICE (71) Applicant: NSK LTD., Tokyo (JP)

(72) Inventors: Shin Mihara, Gunma (JP); Osamu Kurihara, Gunma (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/775,712

(22) PCT Filed: Nov. 5, 2020

(86) PCT No.: PCT/JP2020/041270
§ 371 (c)(1),
(2) Date: May 10, 2022

(87) PCT Pub. No.: WO2021/095615
PCT Pub. Date: May 20, 2021

(65) Prior Publication Data
US 2022/0379948 A1 Dec. 1, 2022

(30) Foreign Application Priority Data
Nov. 12, 2019 (JP) ................. 2019-204770

(51) Int. Cl.
*B62D 1/184* (2006.01)
(52) U.S. Cl.
CPC .................. *B62D 1/184* (2013.01)
(58) Field of Classification Search
CPC ............... B62D 21/184; B62D 1/184
See application file for complete search history.

(56) References Cited

U.S. PATENT DOCUMENTS 5,531,317 A 7/1996 Tomaru
5,570,610 A 11/1996 Cymbal
(Continued)

FOREIGN PATENT DOCUMENTS

CN 101765533 A 6/2010
CN 104245475 A 12/2014
(Continued)

OTHER PUBLICATIONS

International Search Report of PCT/JP2020/041270 dated Dec. 8, 2020 [PCT/ISA/210].
(Continued)

*Primary Examiner* — Jason D Shanske
*Assistant Examiner* — Matthew James O'Neill
(74) *Attorney, Agent, or Firm* — Sughrue Mion, PLLC (57) ABSTRACT

A steering device including a steering column supporting a steering shaft to be coupled to a steering wheel. The steering column is sandwiched between a bracket including a first support plate and a second support plate with a tightening shaft penetrating the first support plate and the second support plate and including a male thread at an end of the tightening shaft on a side close to the second support plate having a nut attached thereon. An operation lever is disposed between the nut and the second support plate and penetrated by the tightening shaft. A case including a bottom surface facing an end surface of the tightening shaft is attached to the operation lever, and a coil spring coming into contact with the bottom surface and the tightening shaft.

12 Claims, 9 Drawing Sheets

(56) References Cited

U.S. PATENT DOCUMENTS

| | | | |
|---|---|---|---|
| 6,099,037 A * | 8/2000 | Korzan | B62D 1/192 280/777 |
| 7,412,911 B2 * | 8/2008 | Nishioka | B62D 1/184 74/492 |
| 7,621,562 B2 | 11/2009 | Longo | |
| 8,186,242 B2 | 5/2012 | Uesaka | |
| 9,409,591 B2 | 8/2016 | Johta et al. | |
| 9,738,304 B2 | 8/2017 | Kwon | |
| 9,783,220 B2 * | 10/2017 | Davies | B62D 1/195 |
| 10,737,714 B2 | 8/2020 | Shiroishi | |
| 2008/0150269 A1 | 6/2008 | Longo | |
| 2010/0170364 A1 | 7/2010 | Bertet et al. | |
| 2013/0055844 A1 | 3/2013 | Kim | |
| 2015/0291203 A1 | 10/2015 | Higashino | |
| 2016/0176434 A1 | 6/2016 | Kwon | |
| 2016/0200346 A1 | 7/2016 | Davies | |
| 2018/0237052 A1 * | 8/2018 | Kurokawa | B62D 1/187 |
| 2020/0023883 A1 | 1/2020 | Davies | |

FOREIGN PATENT DOCUMENTS

| | | |
|---|---|---|
| CN | 205706834 U | 11/2016 |
| CN | 109923023 A | 6/2019 |
| CN | 110294011 A | 10/2019 |
| JP | 55-160974 U | 11/1980 |
| JP | 61-084076 U | 6/1986 |
| JP | 8-20347 A | 1/1996 |
| JP | 09-011912 A | 1/1997 |
| JP | 2010-132179 A | 6/2010 |
| JP | 2014-237416 A | 12/2014 |
| JP | 2016-049875 A | 4/2016 |
| JP | 2016-216041 A | 12/2016 |
| JP | 2017-094813 A | 6/2017 |
| JP | 2018-202963 A | 12/2018 |
| JP | 2019-093736 A | 6/2019 |

OTHER PUBLICATIONS

Office Action dated Jul. 4, 2023 in Japanese Application No. 2019-204770.

Office Action dated Jul. 10, 2023 in Chinese Application No. 202080077819.1.

* cited by examiner

STEERING DEVICE

CROSS REFERENCE TO RELATED APPLICATIONS

This application is a National Stage of International Application No. PCT/JP2020/041270 filed on Nov. 5, 2020, claiming priority based on Japanese Patent Application No. 2019-204770 filed on Nov. 12, 2019, the entire contents are incorporated herein by reference.

FIELD

The present invention relates to a steering device.

BACKGROUND

A vehicle is provided with a steering device as a device for transmitting operation of a steering wheel by an operator (driver) to wheels. The steering device may include an adjusting mechanism for adjusting the position of the steering wheel. For example, Patent Literature 1 discloses an example steering device that can adjust the vertical and axial position of a steering member (steering wheel). In the steering device in Patent Literature 1, a tightening shaft penetrates brackets between which a steering column is sandwiched. An operation lever rotating together with the tightening shaft is operated for switching from a locked state in which the position of the steering wheel is fixed to an unlocked state in which the position of the steering wheel can be adjusted. To prevent rattling of the operation lever in the unlocked state, an elastically deformable coupling member couples the tightening shaft to the operation lever.

CITATION LIST

Patent Literature

Patent Literature 1: Japanese Patent Application Laid-open No. 2016-49875 A

SUMMARY

Technical Problem

In Patent Literature 1, a nut fixing the tightening shaft is disposed on a side opposing the operation lever across the brackets. Force of the brackets tightening the steering column in the locked state is adjusted by the amount of tightening of the nut around the tightening shaft. Thus, the length (protrusion length) of the tightening shaft protruding from the nut differs depending on the individual steering device. If the nut and the operation lever are disposed on the same side relative to the brackets, the distance from the operation lever to the tip of the tightening shaft may be great. In this case, it is difficult to couple the tightening shaft to the operation lever using the coupling member in Patent Literature 1.

In light of the above problem, an object of this disclosure is to provide a steering device that can reduce rattling of an operation lever even when a nut and the operation lever are disposed on the same side relative to a bracket.

Solution to Problem

To achieve the above object, a steering device according to an embodiment of the present disclosure comprising: a steering column supporting a steering shaft to be coupled to a steering wheel; a bracket including a first support plate and a second support plate, the steering column being sandwiched between the first support plate and the second support plate; a tightening shaft penetrating the first support plate and the second support plate and including a male thread at an end of the tightening shaft on a side close to the second support plate; a nut attached to the male thread; an operation lever disposed between the nut and the second support plate and penetrated by the tightening shaft; a case including a bottom surface facing an end surface of the tightening shaft, the case being attached to the operation lever; and a coil spring coming into contact with the bottom surface and the tightening shaft.

This allows the operation lever to be pulled toward the nut. Thus, rattling of the operation lever is reduced. Furthermore, the coil spring can easily have a small spring constant. Thus, even if the distance from the operation lever to the tip of the tightening shaft is great, the tightening shaft and the operation lever are readily coupled to each other via the coil spring. Therefore, the steering device of this disclosure can reduce rattling of the operation lever even when the nut and the operation lever are disposed on the same side relative to the bracket.

In a desirable aspect of the above-described steering device, the case includes a first small diameter portion having a cylindrical shape along the outer periphery of the coil spring. By this, the coil spring is difficult to lean. A state in which the coil spring presses the tightening shaft and the case straight in the axial direction of the tightening shaft is maintained. The coil spring presses the tightening shaft and the case with appropriate force, so that the steering device of this disclosure can further reduce rattling of the operation lever.

In a desirable aspect of the above-described steering device, the case includes a second small diameter portion having an inner diameter greater than the inner diameter of the first small diameter portion and disposed on a side close to the operation lever relative to the first small diameter portion, and the end surface of the tightening shaft is disposed inside the second small diameter portion. This increases a gap between the tightening shaft and the case. The steering device of this disclosure can reduce generation of abnormal noise caused by contact between the tightening shaft and the case.

In a desirable aspect of the above-described steering device, the tightening shaft includes an inclined surface disposed between the end surface and an outer peripheral surface, and the coil spring has an inner diameter equal to or greater than the diameter of the end surface of the tightening shaft. This allows the coil spring to come into contact with the inclined surface, so that the coil spring is difficult to lean. The state in which the coil spring presses the tightening shaft and the case straight in the axial direction of the tightening shaft is maintained. The coil spring presses the tightening shaft and the case with appropriate force, so that the steering device of this disclosure can further reduce rattling of the operation lever.

A desirable aspect of the above-described steering device includes a lubricant applied to the surface of the coil spring. This reduces friction between the coil spring and the case and friction between the coil spring and the tightening shaft. The steering device of this disclosure can reduce generation of abnormal noise caused by friction of the coil spring.

A desirable aspect of the above-described steering device includes a thrust bearing disposed between the nut and the operation lever. This allows the coil spring to pull the thrust bearing toward the nut in a state (unlocked state) in which the position of the steering column can be adjusted. The steering device of this disclosure can reduce abnormal noise caused by rattling of the thrust bearing in the unlocked state.

Advantageous Effects of Invention

The steering device of this disclosure can reduce rattling of the operation lever even when the nut and the operation lever are disposed on the same side relative to the bracket.

DESCRIPTION OF EMBODIMENTS

The present invention will be described in detail below with reference to the drawings. Note that the following mode for implementing the invention (hereinafter referred to as an embodiment) should not be construed to limit the present invention. Furthermore, constituents of the following embodiment include constituents that can be easily conceived by those skilled in the art, that are substantially the same, and that are within the so-called scope of equivalents. Moreover, constituents disclosed in the following embodiment can be combined as appropriate.

Figure 1:
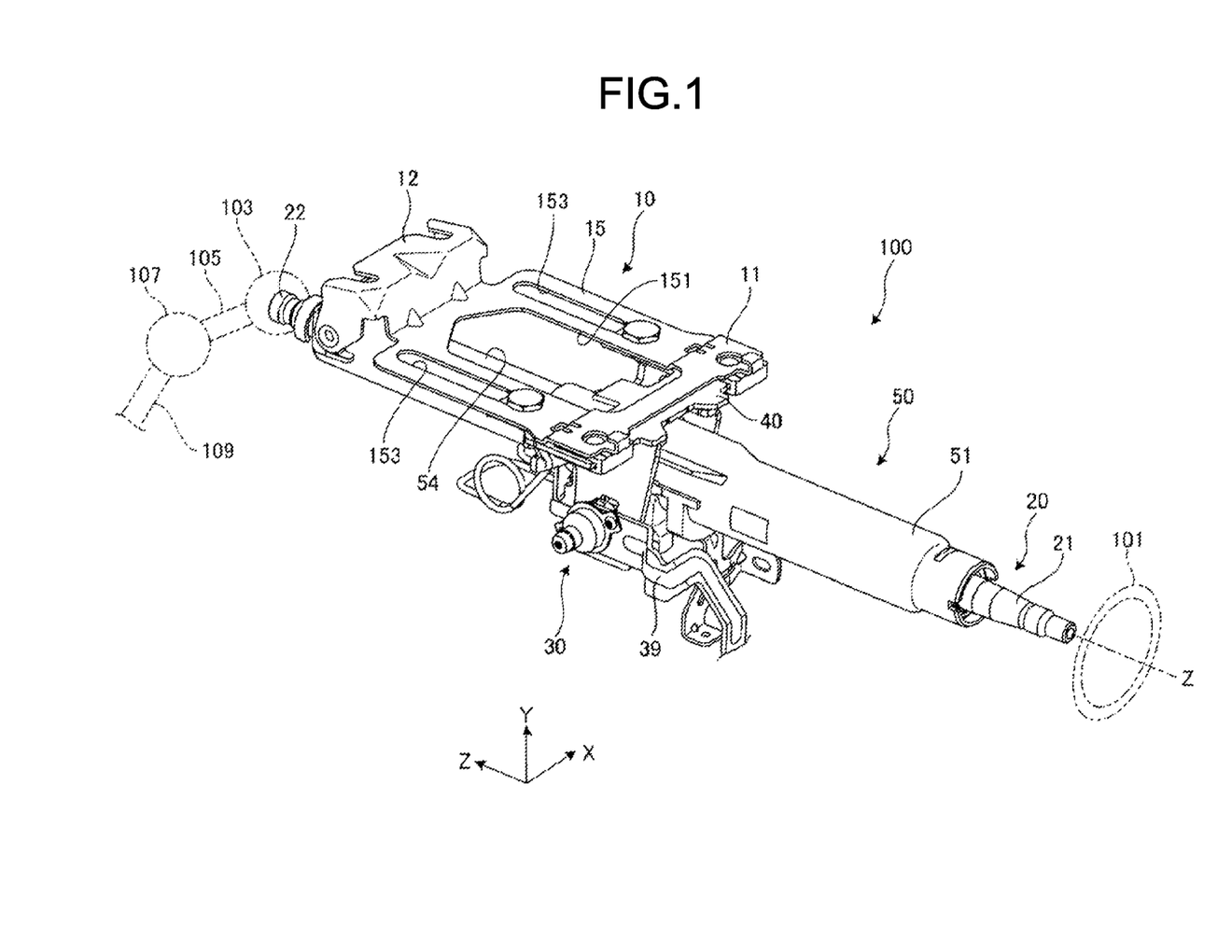
FIG. 1 is a perspective view of a steering device according to an embodiment.
Figure 2:
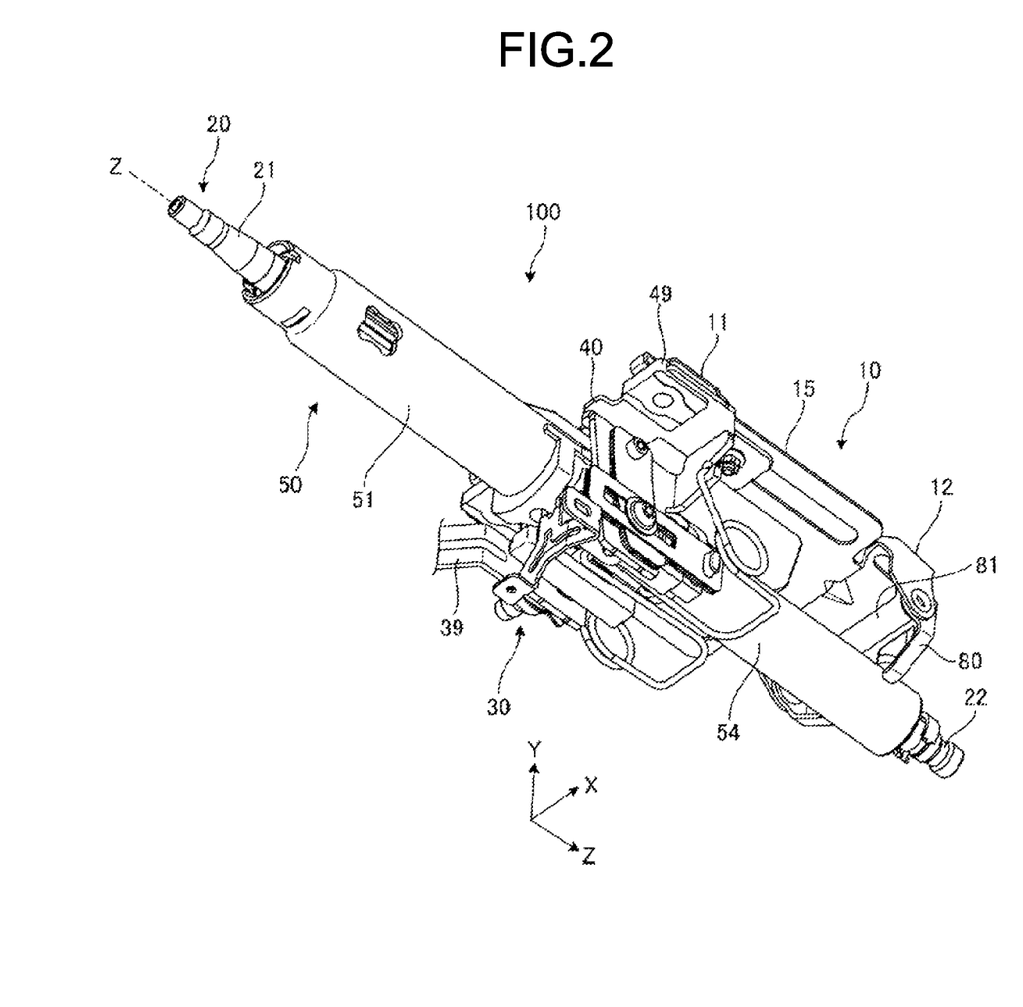
FIG. 2 is a perspective view of the steering device according to the embodiment.
Figure 3:
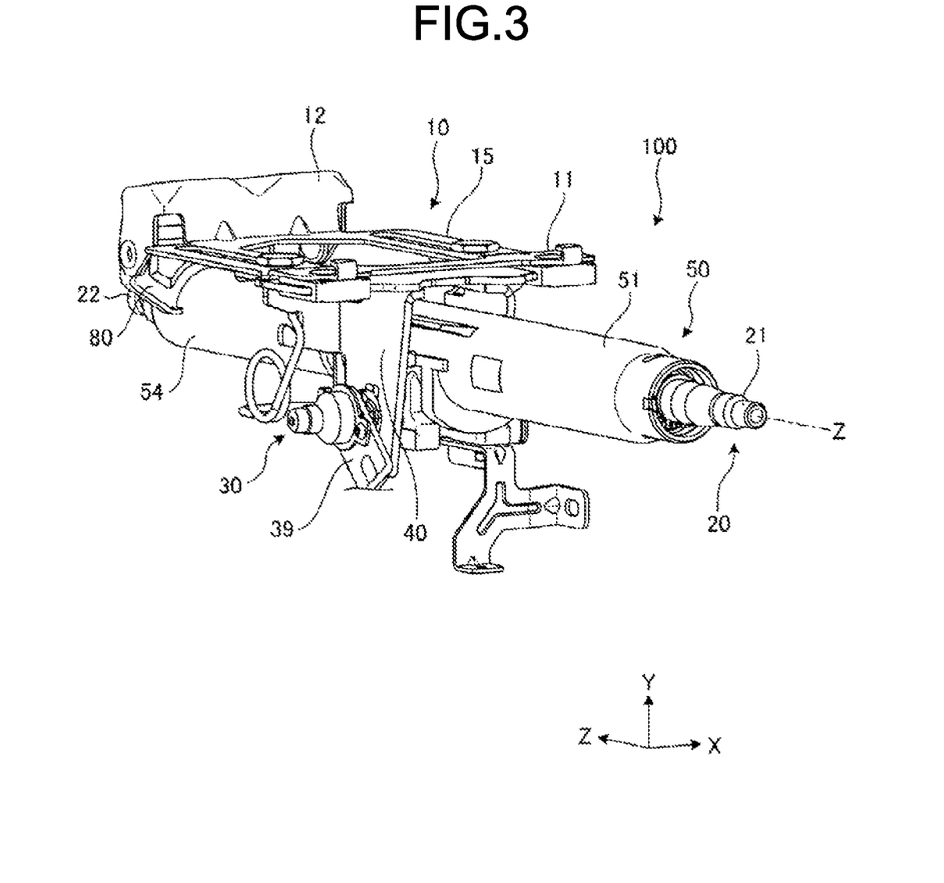
FIG. 3 is a perspective view of the steering device according to the embodiment.
Figure 4:
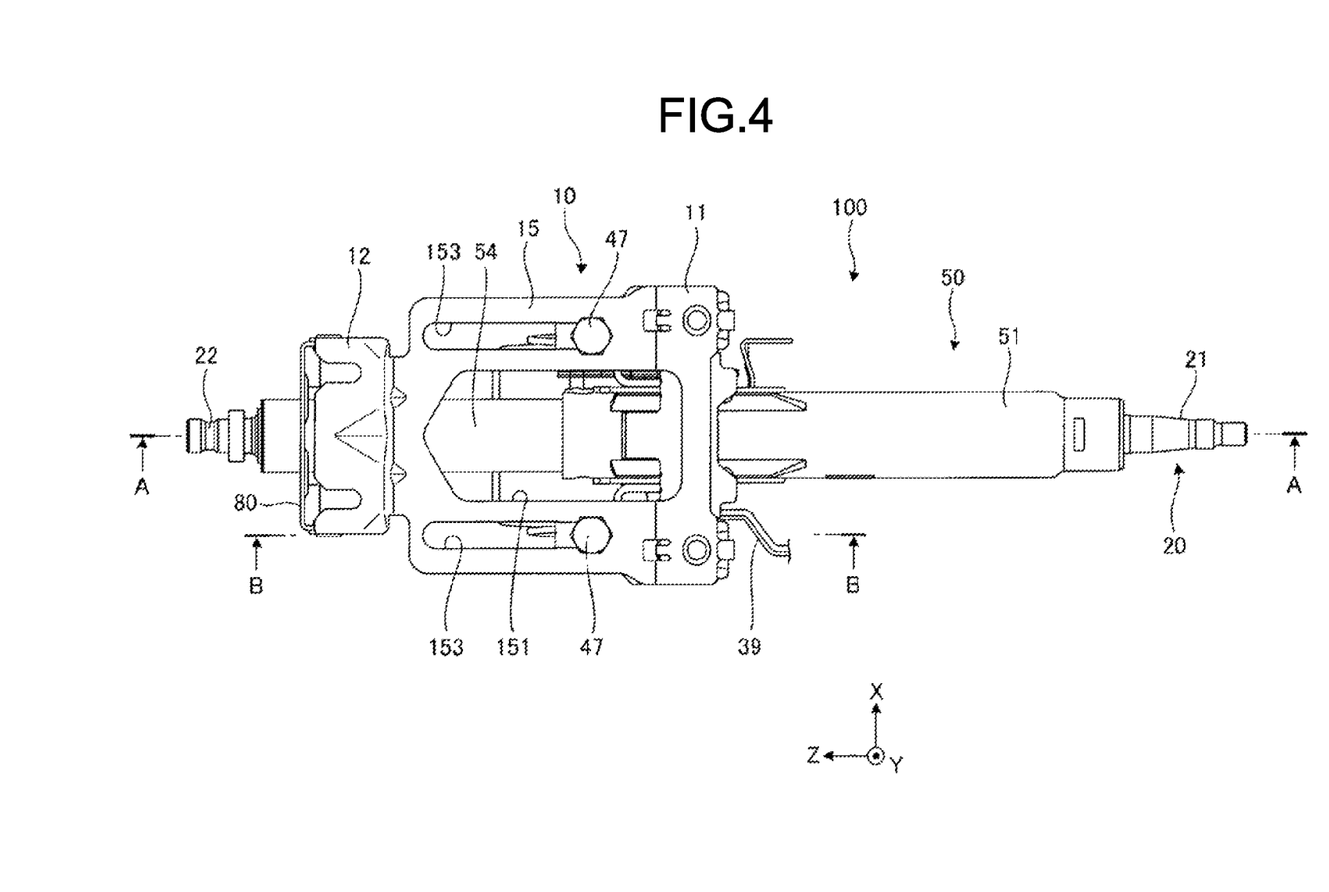
FIG. 4 is a plan view of the steering device according to the embodiment.
Figure 5:
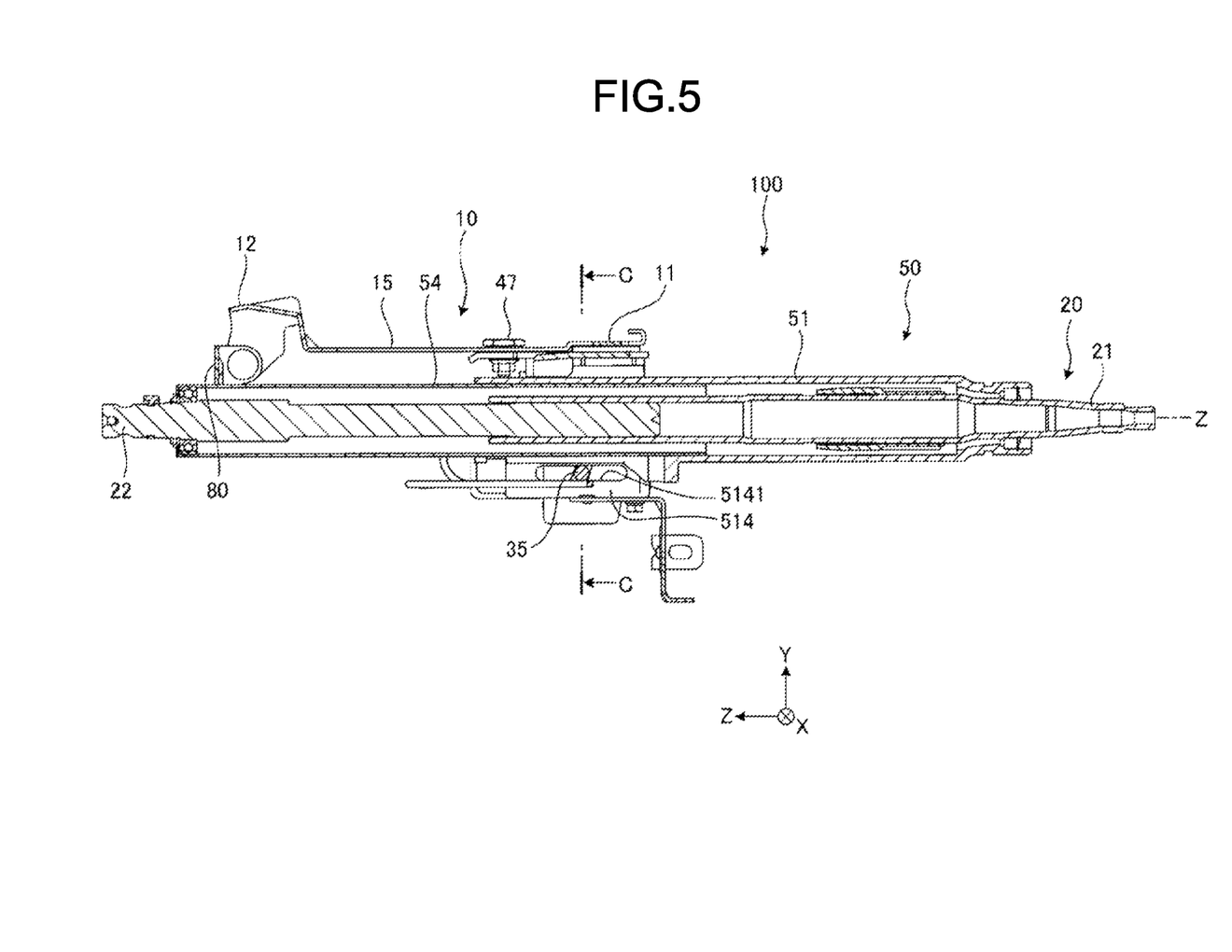
FIG. 5 is a sectional view taken along line A-A in FIG. 4.
Figure 6:
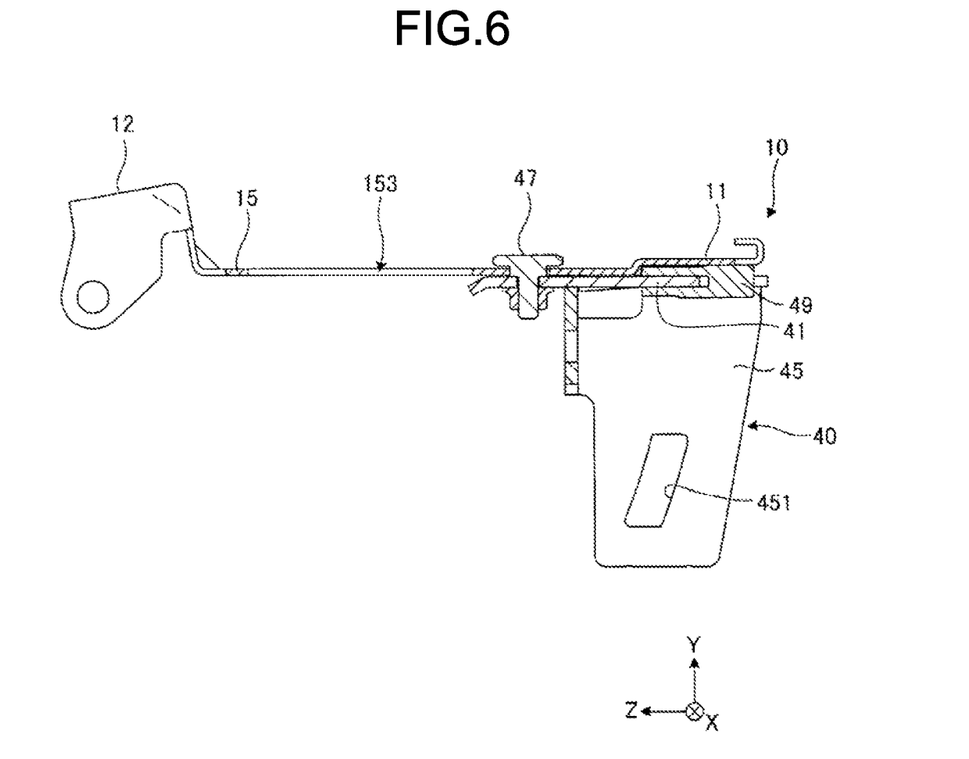
FIG. 6 is a sectional view taken along line B-B in FIG. 4.
Figure 7:
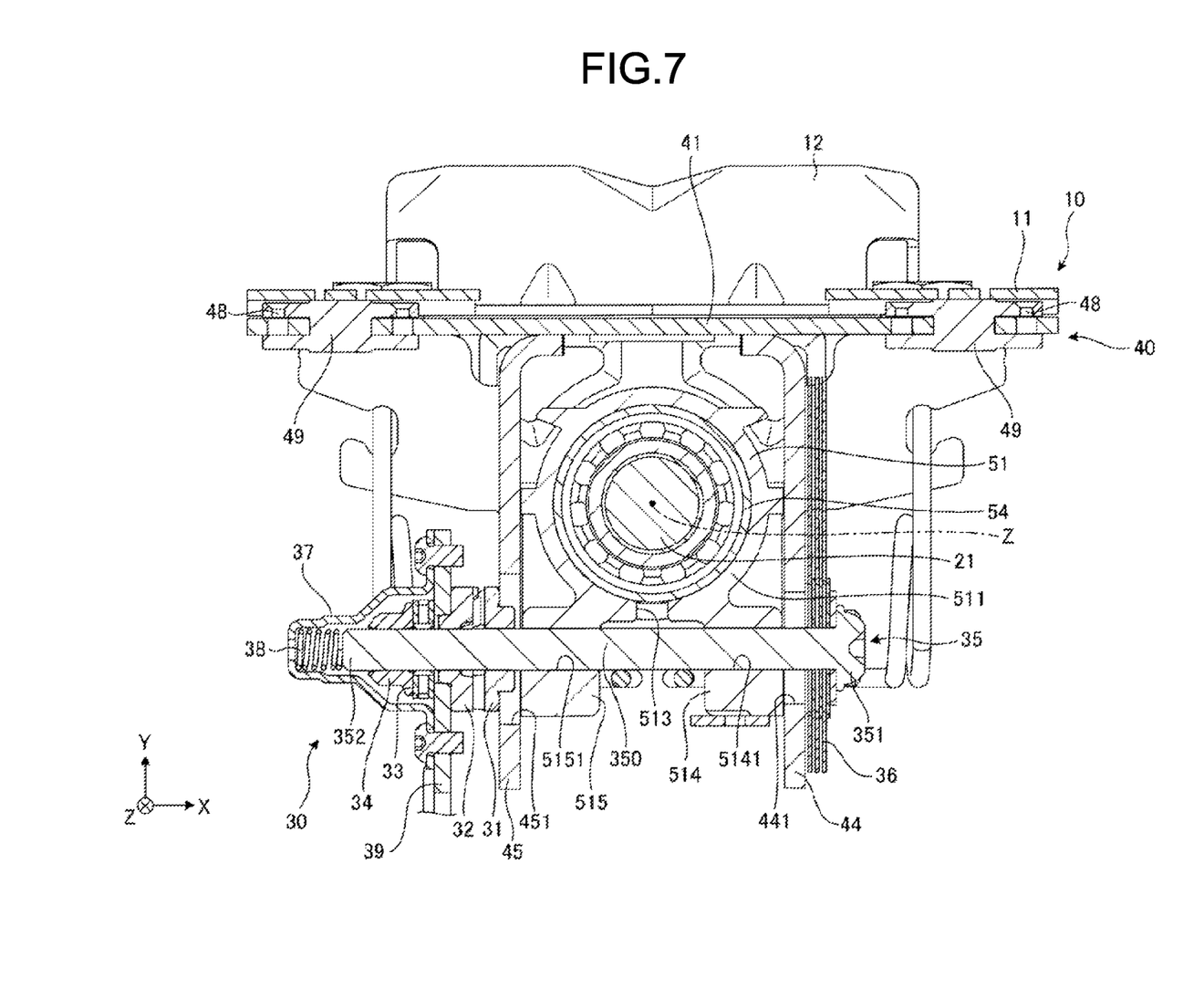
FIG. 7 is a sectional view taken along line C-C in FIG. 5.
Figure 8:
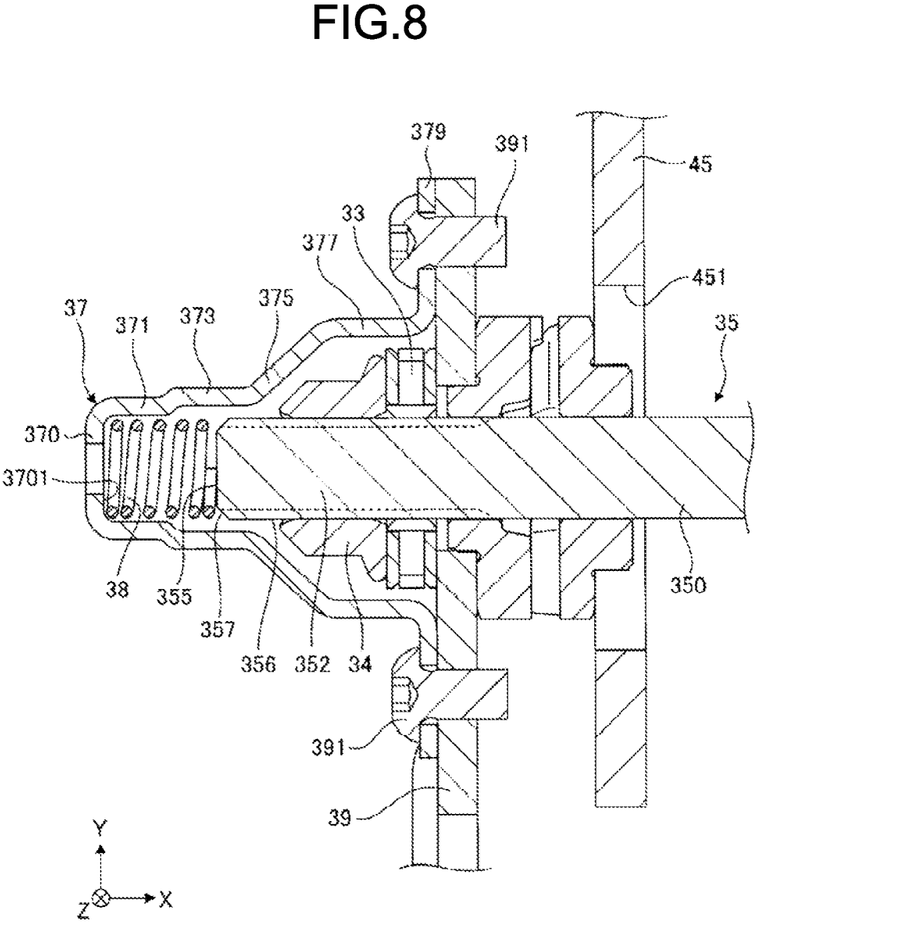
FIG. 8 is an enlarged view of the vicinity of an operation lever in FIG. 7.
Figure 9:
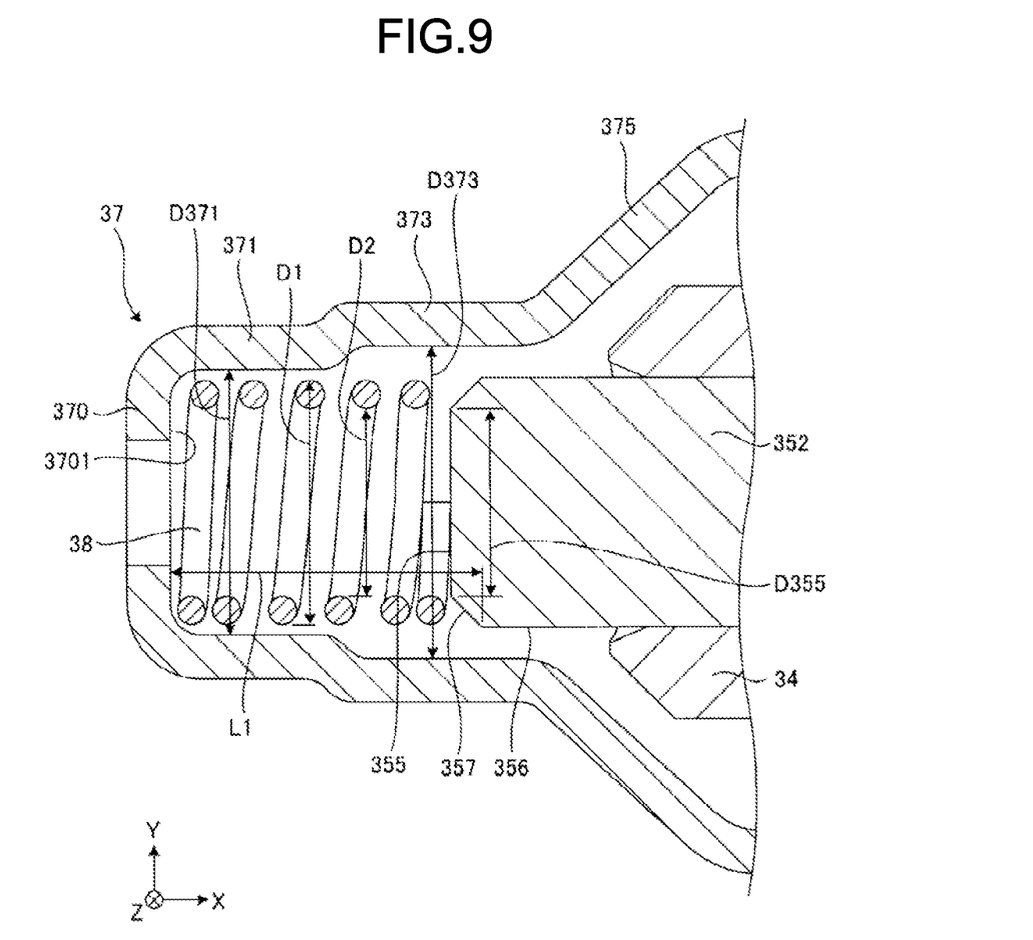
FIG. 9 is an enlarged view of the vicinity of a coil spring in FIG. 7.

FIG. 1 is a perspective view of a steering device according to an embodiment. FIG. 2 is a perspective view of the steering device according to the embodiment. FIG. 3 is a perspective view of the steering device according to the embodiment. FIG. 4 is a plan view of the steering device according to the embodiment. FIG. 5 is a sectional view taken along line A-A in FIG. 4. FIG. 6 is a sectional view taken along line B-B in FIG. 4. FIG. 7 is a sectional view taken along line C-C in FIG. 5. FIG. 8 is an enlarged view of the vicinity of an operation lever in FIG. 7. FIG. 9 is an enlarged view of the vicinity of a coil spring in FIG. 7.

Embodiment

As illustrated in FIG. 1, a steering device 100 includes a steering wheel 101, a steering shaft 20, a universal joint 103, an intermediate shaft 105, and a universal joint 107. The steering device 100 is joined to a pinion shaft 109.

As illustrated in FIG. 1, the steering shaft 20 includes an input shaft 21 and an output shaft 22. The input shaft 21 and the output shaft 22 are supported by a steering column 50. One end of the input shaft 21 is to be coupled to the steering wheel 101. The other end of the input shaft 21 is coupled to the output shaft 22. The input shaft 21 is coupled in such a manner that the input shaft 21 can transmit torque to the output shaft 22 and can move axially relative to the output shaft 22. The output shaft 22 is coupled to the universal joint 103. One end of the intermediate shaft 105 is coupled to the universal joint 103. The other end of the intermediate shaft 105 is coupled to the universal joint 107. The universal joint 107 is coupled to the pinion shaft 109.

In the following description, an XYZ orthogonal coordinate system is used. The X-axis is parallel to the vehicle width direction of a vehicle equipped with the steering device 100. The Z-axis is parallel to the longitudinal direction of the steering shaft 20 (parallel to a rotation axis Z). The Y-axis is perpendicular to both the X-axis and the Z-axis. The direction along the X-axis is referred to as an X direction, the direction along the Y-axis is referred to as a Y direction, and the direction along the Z-axis is referred to as a Z direction. A direction toward the front of the vehicle in the Z direction is referred to as +Z direction. A rightward direction when an operator faces the +Z direction is referred to as +X direction. An upward direction in the Y direction is referred to as +Y direction.

As illustrated in FIG. 2, the steering device 100 includes the steering column 50, a top plate 10, a first bracket 40, a second bracket 80, and a tightening mechanism 30.

The steering column 50 is a member supporting the steering shaft 20. The input shaft 21 and the output shaft 22 of the steering shaft 20 can rotate about the rotation axis Z. The rotation axis Z is a straight line passing through the center of gravity of each section when the input shaft 21 is cut in a plane orthogonal to the longitudinal direction of the input shaft 21.

The steering column 50 includes an upper column 51 and a lower column 54. The upper column 51 is a substantially cylindrical member. The upper column 51 is disposed at the rear of the lower column 54. The upper column 51 supports the input shaft 21 via a bearing. The lower column 54 is a substantially cylindrical member. A portion of the lower column 54 is fitted inside the upper column 51. A portion of the lower column 54 comes into contact with an inner wall of the upper column 51. Friction occurs between the upper column 51 and the lower column 54. In normal use, the friction between the upper column 51 and the lower column 54 restricts relative movement of the upper column 51 and the lower column 54. On the other hand, if a heavy load is applied to the upper column 51 (for example, in a secondary collision), the upper column 51 and the lower column 54 move relative to each other against the friction.

As illustrated in FIG. 7, the upper column 51 includes a body portion 511, a slit 513, a protruding portion 514, and a protruding portion 515. The body portion 511 is a cylindrical member covering the steering shaft 20. The slit 513 is a cut-away portion provided in a portion of the body portion 511. The slit 513 extends in the Z direction. The end of the slit 513 in the −Z direction is open. The protruding portion 514 and the protruding portion 515 extend from the body portion 511 in the −Z direction. The protruding portion 514 is disposed in the +X direction relative to the slit 513. The protruding portion 514 includes a long hole 5141 extending in the Z direction. The protruding portion 515 is disposed in the −X direction relative to the slit 513. The protruding portion 515 includes a long hole 5151 extending in the Z direction.

The top plate 10 is a member for supporting the steering column 50. The top plate 10 is disposed in the +Y direction of the steering column 50. The top plate 10 is fixed to a steering support member provided in the vehicle. As illustrated in FIG. 1, the top plate 10 includes a first fixed portion 11, a second fixed portion 12, and a coupling portion 15. The first fixed portion 11, the second fixed portion 12, and the coupling portion 15 are molded as an integral body.

The first fixed portion 11 is a plate-shaped member. The first fixed portion 11 is disposed, overlapping the upper column 51 when viewed in the Y direction. The first fixed portion 11 is fixed to the steering support member provided in the vehicle, with a bolt.

The second fixed portion 12 is a box-shaped member. The second fixed portion 12 is disposed on the front side relative to the first fixed portion 11. The second fixed portion 12 is disposed, overlapping the lower column 54 when viewed in the Y direction. The width of the second fixed portion 12 in the X direction is smaller than the width of the first fixed portion 11 in the X direction. The second fixed portion 12 is fixed to the steering support member provided in the vehicle, with a bolt.

The coupling portion 15 is a plate-shaped member. The coupling portion 15 couples the first fixed portion 11 to the second fixed portion 12. The width of the coupling portion 15 in the X direction is substantially equal to the width of the first fixed portion 11 in the X direction and is greater than the width of the second fixed portion 12 in the X direction. The coupling portion 15 includes a first hole 151 and two second holes 153. The first hole 151 is disposed in the center of the coupling portion 15. The steering support member provided in the vehicle may be disposed close to the top plate 10. The first hole 151 is a hole for preventing interference between the steering support member and the top plate 10. For example, a portion of the steering support member is inserted into the first hole 151. The second holes 153 are long holes along the Z direction. In other words, the second holes 153 are long holes extending from the first fixed portion 11 toward the second fixed portion 12. The second holes 153 are disposed on both sides of the first hole 151.

The first bracket 40 and the second bracket 80 are members for supporting the steering column 50. The first bracket 40 is also called a tilt bracket. The second bracket 80 is also called a pivot bracket. The second bracket 80 is disposed in the +Z direction relative to the first bracket 40. The first bracket 40 is attached to the first fixed portion 11 with a bolt. The bolt coupling the first bracket 40 to the first fixed portion 11 is the bolt coupling the first fixed portion 11 to the steering support member. The second bracket 80 is fixed to an outer peripheral surface of the lower column 54. The second bracket 80 is attached to the second fixed portion 12 in such a manner that the second bracket 80 can rotate relative to the second fixed portion 12. As illustrated in FIG. 2, the second bracket 80 includes a pivot shaft 81 having an axial direction along the X direction. The pivot shaft 81 is coupled to the second fixed portion 12. The steering column 50 can rotate about the pivot shaft 81.

As illustrated in FIGS. 6 and 7, the first bracket 40 includes an attachment plate 41, separation capsules 49, guide pins 47, a first support plate 44, and a second support plate 45. An attachment plate 42 is disposed in the +Y direction of the steering column 50. The separation capsules 49 are attached to the first fixed portion 11 with bolts. The separation capsules 49 are formed with a lightweight alloy, such as an aluminum alloy for die casting (an aluminum alloy die casting (ADC) material). The attachment plate 42 is coupled to the separation capsules 49 using, for example, resin members 48 formed through resin injection. A load applied to the steering column 50 in the +Z direction in a secondary collision or the like allows the attachment plate 42 to move relative to the separation capsules 49, cutting the resin members 48. This allows the first bracket 40 except the separation capsules 49 and the upper column 51 to separate from the steering support member. In this way, the first bracket 40 is attached to the first fixed portion 11 in such a manner that the first bracket 40 can separate from the first fixed portion 11 when a predetermined load is applied. After the first bracket 40 separates from the first fixed portion 11, the friction between the upper column 51 and the lower column 54 absorbs impact.

As illustrated in FIG. 6, each of the guide pins 47 is attached to the attachment plate 41. The guide pin 47 extends through the second hole 153 of the coupling portion 15. The guide pin 47 is guided by an inner wall of the second hole 153. This allows the upper column 51 to readily move straight in the Z direction after the first bracket 40 separates from the first fixed portion 11.

As illustrated in FIG. 7, the first support plate 44 and the second support plate 45 are plate-shaped members extending from the attachment plate 41 in the −Y direction. The first support plate 44 and the second support plate 45 are disposed with a gap therebetween in the X direction. The steering column 50 is sandwiched between the first support plate 44 and the second support plate 45. In other words, the steering column 50 is disposed between the first support plate 44 and the second support plate 45. The first support plate 44 includes a long hole 441. The second support plate 45 includes a long hole 451. The long hole 441 and the long hole 451 extend along arcs centered around the pivot shaft 81 illustrated in FIG. 2 (see FIG. 6).

The tightening mechanism 30 is a device for switching between a state in which the position of the steering column 50 can be adjusted and a state in which the position of the steering column 50 is fixed. As illustrated in FIG. 7, the tightening mechanism 30 includes a tightening shaft 35, a plurality of friction plates 36, a stationary cam 31, a movable cam 32, a nut 34, a thrust bearing 33, an operation lever 39, a case 37, and a coil spring 38.

As illustrated in FIG. 7, the tightening shaft 35 includes a shaft portion 350, a head portion 351, and a male thread 352. The shaft portion 350 is a columnar member. The shaft portion 350 extends through the long hole 441, the long hole 5141, the long hole 5151, and the long hole 451. The head portion 351 is disposed at the end of the shaft portion 350 in the +X direction. The male thread 352 is disposed at the end of the shaft portion 350 in the −X direction. The friction plates 36 are disposed between the head portion 351 and the first support plate 44. The shaft portion 350 penetrates the friction plates 36.

The stationary cam 31 is a substantially disk-shaped member. The stationary cam 31 is disposed in the −X direction of the second support plate 45. The tightening shaft 35 penetrates the stationary cam 31. A portion of the stationary cam 31 is fitted into the long hole 451. This prevents the stationary cam 31 from rotating relative to the second support plate 45.

The movable cam 32 is a substantially disk-shaped member. The movable cam 32 is disposed in the −X direction of the stationary cam 31. The tightening shaft 35 penetrates the movable cam 32. A portion of the movable cam 32 is fitted into the operation lever 39. This allows the movable cam 32 to rotate together with the operation lever 39. Thus, the movable cam 32 rotates relative to the stationary cam 31. The movable cam 32 moves in the X direction in accordance with the relative angle to the stationary cam 31. For example, the movable cam 32 includes an inclined surface along a peripheral direction centered around the tightening shaft 35. The stationary cam 31 includes a recess portion into which the inclined surface of the movable cam 32 is fitted. If the movable cam 32 rotates in a state in which the inclined surface is fitted into the recess portion, the inclined surface runs up onto the stationary cam 31, allowing the movable cam 32 to move in the −X direction.

The operation lever 39 is a member for rotating the movable cam 32. The operation lever 39 is disposed in the −X direction of the movable cam 32. The tightening shaft 35 penetrates the operation lever 39. The operation lever 39 extends into a vehicle interior and is operated by the operator.

The nut 34 is disposed in the −X direction of the operation lever 39. The nut 34 is attached to the male thread 352 of the tightening shaft 35. The thrust bearing 33 is disposed between the operation lever 39 and the nut 34. This prevents the nut 34 from rotating even when the operation lever 39 rotates. When the operation lever 39 is rotated, the movable cam 32 rotates while the tightening shaft 35 and the nut 34 do not rotate.

If the operation lever 39 is rotated so that the movable cam 32 moves away from the stationary cam 31, the head portion 351 of the tightening shaft 35 is pressed against the friction plates 36, and the stationary cam 31 is pressed against the second support plate 45. This increases friction between the head portion 351 and the friction plates 36, friction between the friction plates 36, friction between the friction plates 36 and the first support plate 44, and friction between the stationary cam 31 and the second support plate 45. Thus, the tightening shaft 35 cannot move in the long hole 441 and the long hole 451, and the position of the steering column 50 in the Y direction (vertical direction) is fixed. Furthermore, the upper column 51 is tightened, so that the width of the slit 513 is decreased. The inner peripheral surface of the upper column 51 is pressed against the outer peripheral surface of the lower column 54. The friction between the upper column 51 and the lower column 54 is increased.

Thus, the tightening shaft 35 cannot move in the long hole 5141 and the long hole 5151, and the position of the upper column 51 in the Z direction (front-back direction) is fixed.

If the operation lever 39 is rotated so that the movable cam 32 moves closer to the stationary cam 31, the friction between the head portion 351 and the friction plates 36, the friction between the friction plates 36, the friction between the friction plates 36 and the first support plate 44, and the friction between the stationary cam 31 and the second support plate 45 are decreased or disappear. This allows the tightening shaft 35 to move in the long hole 441 and the long hole 451, allowing the steering column 50 to be adjusted in the Y direction (vertical direction). Furthermore, the width of the slit 513 of the upper column 51 is increased, so that the friction between the upper column 51 and the lower column 54 is decreased or disappears. Thus, the tightening shaft 35 can move in the long hole 5141 and the long hole 5151, and the position of the upper column 51 in the Z direction (front-back direction) can be adjusted.

As illustrated in FIG. 8, the case 37 is attached to the operation lever 39. The case 37 is fixed to the operation lever 39 with fixing members 391. The fixing members 391 are, for example, bolts. The case 37 rotates together with the operation lever 39. The case 37 is disposed in the −X direction of the operation lever 39. The case 37 covers a tip of the tightening shaft 35 and the nut 34. The case includes a bottom portion 370, a first small diameter portion 371, a second small diameter portion 373, a widening portion 375, a large diameter portion 377, and a fixed portion 379.

The bottom portion 370 is a disk-shaped member orthogonal to the X direction. The bottom portion 370 includes a hole in its center. The bottom portion 370 includes a bottom surface 3701 being a surface facing an end surface 355 of the tightening shaft 35. The bottom surface 3701 is parallel to the end surface 355. The bottom portion 370 is disposed in the −X direction relative to the operation lever 39. From the bottom portion 370 toward the operation lever 39 (toward the +X direction), the first small diameter portion 371, the second small diameter portion 373, the widening portion 375, the large diameter portion 377, and the fixed portion 379 are disposed in this order.

The first small diameter portion 371 is a cylindrical member along an outer periphery of the coil spring 38. The first small diameter portion 371 extends from an outer edge of the bottom portion 370 in the +X direction. The first small diameter portion 371 covers a portion of the outer periphery of the coil spring 38. The second small diameter portion 373 is a cylindrical member. As illustrated in FIG. 9, an inner diameter D373 of the second small diameter portion 373 is greater than an inner diameter D371 of the first small diameter portion 371. The inner diameter D373 of the second small diameter portion 373 is greater than an outer diameter of the male thread 352 of the tightening shaft 35. The end surface 355 of the tightening shaft 35 is disposed inside the second small diameter portion 373.

As illustrated in FIG. 8, the widening portion 375 is a tubular member having an inner diameter increasing in the +X direction. The large diameter portion 377 is a cylindrical member. An inner diameter of the large diameter portion 377 is greater than the inner diameter of the second small diameter portion 373. The inner diameter of the large diameter portion 377 is greater than an outer diameter of the thrust bearing 33 and an outer diameter of the nut 34. The fixed portion 379 is a plate-shaped member orthogonal to the X direction. The fixed portion 379 comes into contact with the operation lever 39. The fixing members 391 fix the fixed portion 379 to the operation lever 39.

As illustrated in FIG. 9, the tightening shaft 35 includes an inclined surface 357 disposed between the end surface 355 and an outer peripheral surface 356. The inclined surface 357 is formed by, for example, chamfering the edge of an end of the tightening shaft 35. By providing the inclined surface 357, a diameter D355 of the end surface 355 is smaller than a diameter of the outer peripheral surface 356.

The coil spring 38 is disposed inside the case 37. The coil spring 38 is a compression coil spring. An outer diameter of the coil spring 38 is fixed. The outer diameter D1 of the coil spring 38 is equal to or smaller than the inner diameter D371 of the first small diameter portion 371. An inner diameter D2 of the coil spring 38 is equal to or greater than the diameter D355 of the end surface 355. The natural length of the coil spring 38 is greater than a maximum distance L1 from the bottom surface 3701 to the inclined surface 357 illustrated in FIG. 9. One end of the coil spring 38 comes into contact with the bottom surface 3701. The other end of the coil spring 38 comes into contact with the inclined surface 357. The coil spring 38 is compressed while coming into contact with the bottom surface 3701 and the inclined surface 357. Furthermore, a lubricant is applied to the surface of the coil spring 38. The lubricant is, for example, grease.

Note that the coil spring 38 is not necessarily required to come into contact with the inclined surface 357. For example, the coil spring 38 may come into contact with the end surface 355. If the coil spring 38 comes into contact with the end surface 355, the natural length of the coil spring 38 should be greater than the distance from the bottom surface 3701 to the end surface 355.

The case 37 is not necessarily required to have the above-described structure. The case 37 should be attached to the operation lever 39 and include the bottom surface 3701 coming into contact with the coil spring 38. The case 37 is not required to be fixed to the operation lever 39 with the fixing members 391. For example, the case 37 may be fixed to the operation lever 39 by welding.

As described above, the steering device 100 includes the steering column 50, the bracket (first bracket 40), the tightening shaft 35, the nut 34, the operation lever 39, the case 37, and the coil spring 38. The steering column 50 supports the steering shaft 20 to be coupled to the steering wheel 101. The bracket (first bracket 40) includes the first support plate 44 and the second support plate 45 between which the steering column 50 is sandwiched. The tightening shaft 35 penetrates the first support plate 44 and the second support plate 45 and includes the male thread 352 at the end of the tightening shaft 35 on a side close to the second support plate 45. The nut 34 is attached to the male thread 352. The operation lever 39 is disposed between the nut 34 and the second support plate 45 and is penetrated by the tightening shaft 35. The case 37 includes the bottom surface 3701 facing the end surface 355 of the tightening shaft 35 and is attached to the operation lever 39. The coil spring 38 comes into contact with the bottom surface 3701 and the tightening shaft 35.

Force of the bracket (first bracket 40) tightening the steering column 50 in the state (locked state) in which the position of the steering column 50 is fixed is adjusted by the amount of tightening of the nut 34 around the tightening shaft 35. Thus, the length (protrusion length) of the tightening shaft 35 protruding from the nut 34 differs depending on the individual steering device 100. A distance from the operation lever 39 to the tip of the tightening shaft 35 may be great depending on the individual steering device 100. If a plate-spring-like coupling member is used as in Patent Literature 1, a great spring constant of the coupling member makes it difficult to couple the tightening shaft 35 to the operation lever 39.

In contrast, the steering device 100 of this embodiment includes the case 37 attached to the operation lever 39 and the coil spring 38 coming into contact with the bottom surface 3701 of the case 37 and the tightening shaft 35. This allows the operation lever 39 to be pulled toward the nut 34. Thus, rattling of the operation lever 39 is reduced. Furthermore, the coil spring 38 can easily have a small spring constant. Thus, even if the distance from the operation lever 39 to the tip of the tightening shaft 35 is great, the tightening shaft 35 and the operation lever 39 are readily coupled to each other via the coil spring 38. Therefore, the steering device 100 of this embodiment can reduce rattling of the operation lever 39 even when the nut 34 and the operation lever 39 are disposed on the same side relative to the bracket (first bracket 40).

Furthermore, the coil spring 38 comes into contact with the case 37, so that rotation of the case 37 together with the operation lever 39 may also rotate the coil spring 38. If the coil spring 38 comes into contact with the nut 34 instead of the tightening shaft 35, torque applied to the nut 34 by the coil spring 38 may rotate the nut 34. Rotation of the nut 34 varies the length (protrusion length) of the tightening shaft 35 protruding from the nut 34, which causes elastic force of the coil spring 38 to differ from a designed value. In contrast, in the steering device 100, the coil spring 38 comes into contact with the male thread 352 of the tightening shaft 35 instead of the nut 34. This reduces rotation of the nut 34 caused by rotation of the coil spring 38. Furthermore, the outer diameter of the male thread 352 is smaller than the outer diameter of the nut 34, so that, even if the coil spring 38 applies torque to the male thread 352, the torque is smaller than torque applied to the nut 34 by the coil spring 38. Thus, rotation of the tightening shaft 35 is reduced. Therefore, the steering device 100 can reduce variation in the length (protrusion length) of the tightening shaft 35 protruding from the nut 34 and maintain appropriate elastic force of the coil spring 38.

In the steering device 100, the case 37 includes the first small diameter portion 371 having a cylindrical shape along the outer periphery of the coil spring 38. By this, the coil spring 38 is difficult to lean. A state in which the coil spring 38 presses the tightening shaft 35 and the case 37 straight in the axial direction of the tightening shaft 35 is maintained. The coil spring 38 presses the tightening shaft 35 and the case 37 with appropriate force, so that the steering device 100 of this embodiment can further reduce rattling of the operation lever 39.

In the steering device 100, the case 37 includes the second small diameter portion 373 having the inner diameter D373 greater than the inner diameter D371 of the first small diameter portion 371 and disposed on the side close to the operation lever 39 relative to the first small diameter portion 371. The end surface 355 of the tightening shaft 35 is disposed inside the second small diameter portion 373. This increases a gap between the tightening shaft 35 and the case 37. The steering device 100 of this embodiment can reduce generation of abnormal noise caused by contact between the tightening shaft 35 and the case 37.

In the steering device 100, the tightening shaft 35 includes the inclined surface 357 disposed between the end surface 355 and the outer peripheral surface 356. The inner diameter D2 of the coil spring 38 is equal to or greater than the diameter D355 of the end surface 355 of the tightening shaft 35. This allows the coil spring 38 to come into contact with the inclined surface 357, so that the coil spring 38 is difficult to lean. The state in which the coil spring 38 presses the tightening shaft 35 and the case 37 straight in the axial direction of the tightening shaft 35 is maintained. The coil spring 38 presses the tightening shaft 35 and the case 37 with appropriate force, so that the steering device 100 of this embodiment can further reduce rattling of the operation lever 39.

The steering device 100 includes the lubricant applied to the surface of the coil spring 38. This reduces friction between the coil spring 38 and the case 37 and friction between the coil spring 38 and the tightening shaft 35. The steering device 100 of this embodiment can reduce generation of abnormal noise caused by friction of the coil spring 38.

The steering device 100 includes the thrust bearing 33 disposed between the nut 34 and the operation lever 39. This allows the coil spring 38 to pull the thrust bearing 33 toward the nut 34 in the state (unlocked state) in which the position of the steering column 50 can be adjusted. The steering device 100 can reduce abnormal noise caused by rattling of the thrust bearing 33 in the unlocked state.

REFERENCE SIGNS LIST

10 TOP PLATE
11 FIRST FIXED PORTION
12 SECOND FIXED PORTION
15 COUPLING PORTION
20 STEERING SHAFT
21 INPUT SHAFT

22 OUTPUT SHAFT
30 TIGHTENING MECHANISM
31 STATIONARY CAM
32 MOVABLE CAM
33 THRUST BEARING
34 NUT
35 TIGHTENING SHAFT
36 FRICTION PLATE
37 CASE
38 COIL SPRING
39 OPERATION LEVER
40 FIRST BRACKET (BRACKET)
41 ATTACHMENT PLATE
44 FIRST SUPPORT PLATE
45 SECOND SUPPORT PLATE
47 GUIDE PIN
48 RESIN MEMBER
49 SEPARATION CAPSULE
50 STEERING COLUMN
51 UPPER COLUMN
54 LOWER COLUMN
80 SECOND BRACKET
81 PIVOT SHAFT
100 STEERING DEVICE
101 STEERING WHEEL
103 UNIVERSAL JOINT
105 INTERMEDIATE SHAFT
107 UNIVERSAL JOINT
109 PINION SHAFT
350 SHAFT PORTION
351 HEAD PORTION
352 MALE THREAD
355 END SURFACE
356 OUTER PERIPHERAL SURFACE
357 INCLINED SURFACE
370 BOTTOM PORTION
371 FIRST SMALL DIAMETER PORTION
373 SECOND SMALL DIAMETER PORTION
375 WIDENING PORTION
377 LARGE DIAMETER PORTION
379 FIXED PORTION
391 FIXING MEMBER
441, 451 LONG HOLE
511 BODY PORTION
513 SLIT
514, 515 PROTRUDING PORTION
3701 BOTTOM SURFACE
5141, 5151 LONG HOLE
Z ROTATION AXIS

The invention claimed is:

1. A steering device comprising:
a steering column supporting a steering shaft to be coupled to a steering wheel;
a bracket including a first support plate and a second support plate, the steering column being sandwiched between the first support plate and the second support plate;
a tightening shaft penetrating the first support plate and the second support plate and including a male thread at an end of the tightening shaft on a side close to the second support plate;
a nut attached to the male thread;
an operation lever disposed between the nut and the second support plate and penetrated by the tightening shaft;
a case including a bottom surface facing an end surface of the tightening shaft, the case being attached to the operation lever; and
a coil spring coming into contact with the bottom surface and the tightening shaft.

2. The steering device according to claim 1, wherein the case includes a first small diameter portion having a cylindrical shape along an outer periphery of the coil spring.

3. The steering device according to claim 2, wherein
the case includes a second small diameter portion having an inner diameter greater than an inner diameter of the first small diameter portion, the second small diameter portion being disposed on a side close to the operation lever relative to the first small diameter portion, and
the end surface of the tightening shaft is disposed inside the second small diameter portion.

4. The steering device according to claim 1, wherein
the tightening shaft includes an inclined surface disposed between the end surface and an outer peripheral surface, and
the coil spring has an inner diameter equal to or greater than a diameter of the end surface of the tightening shaft.

5. The steering device according to claim 1, further comprising a lubricant applied to a surface of the coil spring.

6. The steering device according to claim 1, further comprising a thrust bearing disposed between the nut and the operation lever.

7. The steering device according to claim 1,
wherein the end surface of the tightening shaft is a longitudinal end of the tightening shaft,
wherein the bottom surface of the case is parallel to the end surface of the tightening shaft.

8. The steering device according to claim 1,
wherein the case is in direct contact with the operation lever.

9. The steering device according to claim 1,
wherein the case is separated from both of the first support plate and the second support plate.

10. The steering device according to claim 1,
wherein the coil spring is in contact with the bottom surface of the case and the end surface of the tightening shaft, and
wherein the coil spring has an inner diameter equal to or greater than a diameter of the end surface of the tightening shaft.

11. The steering device according to claim 1,
wherein the coil spring is disposed between the bottom surface of the case and the tightening shaft, and
wherein the coil spring has an inner diameter equal to or greater than a diameter of the end surface of the tightening shaft,
wherein the tightening shaft further includes an inclined surface disposed between the end surface and an outer peripheral surface, and
wherein the coil spring comes into contact with the bottom surface of the case and the inclined surface of the tightening shaft.

12. The steering device according to claim 1,
wherein the end surface of the tightening shaft is a longitudinal end of the tightening shaft,
wherein the bottom surface of the case is parallel to the end surface of the tightening shaft,
wherein the coil spring is in contact with the bottom surface of the case and the end surface of the tightening shaft, and wherein the coil spring has an inner diameter equal to or greater than a diameter of the end surface of the tightening shaft.

* * * * *